US008117335B2

(12) United States Patent
Maes

(10) Patent No.: US 8,117,335 B2
(45) Date of Patent: Feb. 14, 2012

(54) SERVICE OR APPLICATION DRIVEN PROCESSING OF NETWORK TRAFFIC USING A SMART ROUTER

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 532 days.

(21) Appl. No.: 11/669,094

(22) Filed: Jan. 30, 2007

(65) Prior Publication Data

US 2008/0181208 A1 Jul. 31, 2008

(51) Int. Cl.
*G06F 15/173* (2006.01)
*G06F 15/16* (2006.01)

(52) U.S. Cl. ........ 709/238; 709/226; 709/229; 709/242; 726/1; 726/2

(58) Field of Classification Search .......... 709/225–229, 709/238–239, 242, 249; 726/1–2
See application file for complete search history.

(56) References Cited

U.S. PATENT DOCUMENTS

| | | | |
|---|---|---|---|
| 6,477,143 B1 * | 11/2002 | Ginossar | 709/235 |
| 6,816,903 B1 * | 11/2004 | Rakoshitz et al. | 709/229 |
| 7,257,833 B1 * | 8/2007 | Parekh et al. | 726/1 |
| 7,272,651 B1 * | 9/2007 | Bolding et al. | 709/227 |
| 7,327,727 B2 * | 2/2008 | Rich et al. | 709/238 |
| 7,346,702 B2 * | 3/2008 | Haviv | 709/238 |
| 7,406,603 B1 * | 7/2008 | MacKay et al. | 713/193 |
| 7,463,637 B2 * | 12/2008 | Bou-Diab et al. | 709/229 |
| 7,769,877 B2 * | 8/2010 | McBride et al. | 709/238 |
| 2005/0015340 A1 | 1/2005 | Maes | |
| 2005/0021670 A1 | 1/2005 | Maes | |
| 2006/0143686 A1 | 6/2006 | Maes | |
| 2007/0237078 A1 * | 10/2007 | Hundscheidt et al. | 370/235 |

* cited by examiner

*Primary Examiner* — Bharat Barot

(74) *Attorney, Agent, or Firm* — Kilpatrick Townsend & Stockton LLP

(57) ABSTRACT

A smart router is used to analyze messages and apply programmable policies to messages based on various diagnostics. Policies can be set by applications or other appropriate entities, such as a service layer. The smart router is able to delegate specific tasks, such as various transport (e.g., firewall, network bandwidth/congestion monitoring), service (e.g., charging, determine quality of service, identify session, filter service level content), and processing (e.g. codec transformation) tasks. Based on the result of the processing, the router can bounce, re-direct, route, or otherwise handle the network traffic.

15 Claims, 5 Drawing Sheets

SERVICE OR APPLICATION DRIVEN PROCESSING OF NETWORK TRAFFIC USING A SMART ROUTER

BACKGROUND OF THE INVENTION

Embodiments of the present invention generally relate to electronic communications, and more particularly relate to the processing and routing of traffic across a network.

Various types of communications networks and devices operate in an ever increasing array of different environments and underlying or supporting protocols. For example, the HyperText Transfer Protocol (HTTP) is commonly used to support communications across various types of networks including the Internet. In another example, the Session Initiation Protocol (SIP) is used by various types of mobile devices to support communications between such devices across various wired and/or wireless networks.

As the variety of devices, protocols, and environments increases, intercommunication between these variations becomes more important. Current methods of initiating, processing, and supporting communications between these environments are difficult to use at best and, in many cases, do not supply a sufficient level of functionality.

In one example, telecommunication networks have developed to a level of intelligence offering sophisticated options such as the ability to apply rates and charge for network traffic, route traffic, and ensure a quality of service for specified traffic using a network level protocol such as resource reservation protocol (RSVP) or IMS, and ensure static firewall operations. As networks are incorporating basic or less intelligent networks, such as are based on Internet technology, it still is desirable to have a minimum level of network intelligence. It therefore is desirable to ensure that some of the functions provided in the network can now be exposed as end points and be controlled, such as by the service layer.

There currently are two major approaches to determining an appropriate implementation solution. In one approach, firewalls are configured to sniff messages, including IP packets such as TCP, UDP, and encrypted packets, as well as RTP or SIP sessions, and either let through or bounce messages according to their settings and a traffic log. Such an approach allows the system to run anti-spam and other processes before depositing an email in a mail box, etc. In another approach, smart routers are used that are able to similarly sniff IP traffic, then route and/or log the traffic accordingly.

Such approaches still are unable to provide a sufficient amount of functionality related to the traffic that is taking place. As technology evolves, it is becoming desirable to do more clever operations across a network, such as rating and charging for appropriate traffic, ensuring a particular quality of service, and maintaining a particular path for certain traffic through a network. For example, actors in the network may wish to reserve a certain quality of service or bandwidth for related traffic. An actor also may wish to ensure some protection capabilities such as using a firewall that will allow some traffic and block other traffic, for example.

BRIEF SUMMARY OF THE INVENTION

Systems and methods in accordance with various embodiments of the present invention provide for the processing of network traffic using a smart router, such as may be service or application driven. Such a router can include a message inspection module operable to receive a message and determine identification information about that message. The router also can include a policy enforcement module operable to dynamically determine a policy to enforce on the message, based at least in part upon the identification information obtained by the message inspection module. A decision as to which policy to enforce can be set by a service layer and/or an application. In another embodiment, the decision as to which policy to enforce is determined based on a matching algorithm. The policy enforcement module then is able to enforce the dynamically determined policy. The policy enforcement module also can direct a message enforcing the appropriate policy, such as by bouncing, re-directing, or routing the message.

The policy evaluation module or policy enforcer, as well as a message inspection module, can be configured to delegate functionality to various resources. For example, the policy enforcement module can delegate tasks, such as transport, service, and processing tasks, which are needed to enforce a policy on a message. The message inspection can be configured to delegate inspection of messages an interceptor or sniffer operable to perform the inspection and return a result to the message inspection module. The message inspection module also can be configured to detect encryption of a message, then delegate decryption and inspection of the message to a decryption resource authorized to decrypt the message, analyze a content of the message, and return a result of the analysis without informing the message inspection module about the content.

In one embodiment, a method of processing network traffic includes receiving a message and determining identifying information about the message. A query is then generated to dynamically determine the appropriate policy to apply to the message. Once an indication of the policy to apply is received in response to the query, the policy is enforced on the message. As discussed above, the indication of the policy to apply can be set a service layer and/or an application, as well as based on a matching algorithm. At least some of the policies also can be preloaded into the smart router to improve efficiency. For example, the service layer may program the policies at or before the time of processing.

As discussed above, various tasks can be delegated to authorized resources. For example, inspection of a message can be delegated to an interceptor and/or a sniffer operable to perform the inspection and return a result. After detecting encryption of a message, a router also can delegate decryption and inspection of the message to a decryption resource authorized to decrypt the message, analyze a content of the message, and return a result of the analysis.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Figure 1:
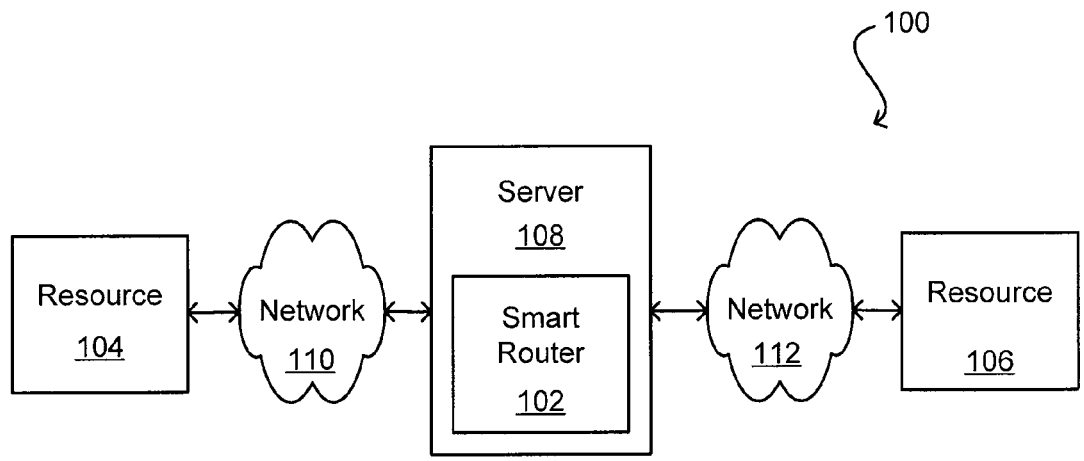
FIG. 1 illustrates a communication path in accordance with one embodiment of the present invention.

Systems and methods in accordance with various embodiments overcome the aforementioned and other deficiencies in existing communications networks and devices by providing a smart router 102 to handle communications between endpoints such as sending and receiving resources 104, 106, such as clients or any sender or requester of a message at any level of communication, as shown in the configuration 100 of FIG. 1. The smart router can be part of, or in communication with, at least one network server 108 operable to receive and transmit communications between the resources over at least one network 110, 112. The smart router is capable of analyzing messages and/or packets (or other communication protocol levels) and applying programmable policies to those messages based on various diagnostics. Policies can be set before processing or in response to a request from the smart router by applications or other appropriate entities, such as a service layer. The smart router is able to delegate specific tasks, such as various transport (e.g., firewall, network bandwidth/congestion monitoring), service (e.g., charging, determine quality of service, identify session, filter service level content), and processing (e.g. codec transformation) tasks. Based on the result of the processing, the router can bounce, re-direct, route, or otherwise handle the network traffic.

Various embodiments utilize a service-oriented or service-based approach to message routing and processing, wherein operations that are associated with a smart router can be driven by interaction with the service layer, where applications are running, or by having applications essentially make requests to the underlying system to determine the appropriate action(s), thus essentially being programmed before or at the time of enforcement by the application to have a particular behavior. Such an approach differs from those of existing systems, which typically have a fixed behavior or configuration. For example, a firewall can be used that has a set of behaviors. The firewall can let some traffic pass, while preventing other traffic from passing. The way in which the firewall behaves can be programmed or changed, but in some embodiments an administration or configuration stage sets the behavior, and when the firewall is running the firewall will make those assumptions based on the configuration. This behavior is somewhat similar to the operation of existing smart routers and/or charging systems. Most of these systems are essentially configured to perform only certain tasks, however, and these systems perform those tasks in a relatively static manner.

An advantage of various embodiments is that the operations of the smart router can be linked in such a way that the operations can be related to operations taking place in the service layer. The linking is done through the application and enforcement of policies that can be loaded from the service layer, or any other appropriate layer, into components that are present in the network and that ensure transport and other functionality.

In one embodiment, a smart router is provided that is capable of inspecting each message passing through the router. The smart router can, in one embodiment, delegate the inspection to an interceptor or sniffers that can perform the inspection for specific protocols, etc., and return the result to the smart router. The smart router can be driven, for example, by the service layer. It can be ensured that each message is inspected through various deployment options or protocol settings. Messages can be identified using message diagnostics, for example, to include any of end points, ports, addressing details, traffic of a certain type (including types such as unknown if encrypted and/or not classifiable), time stamps, etc. After inspecting each message, an appropriate policy can be applied. Policies can be used with the smart router to let pass or bounce messages, as well as to fork, broadcast, and re-route messages. Policies also can be used to modify and/or process messages, as well as to hold messages pending completion of policy evaluation and enforcement. Policies also are capable or delegating process steps, as well as establishing a session for future messages or responses in the same session based on the message diagnostics.

Policies can address such processes as security, charging, logging, auditing, quality of service (including throttling, prioritized routing, etc.), privacy, preferences, and anything else specified by a combination of conditions and actions. Policies can be further customized to enforce any additional clause of interest to the service provider, thus behaving as a full orchestration engine. A service gateway (SGW) in one example can rely on a flow language such as BPEL, Web Service management, and a rule engine. Policies are expressible as BPEL flows, rule sets, and other scripts, and policies can be authored and/or managed with corresponding tools. A SGW can support local (e.g. Java) and WS bindings, for example, as well as other protocols with protocol specific interceptors.

As used herein a policy refers to an ordered combination of policy rules that defines how to administer, manage, and control access to resources. A policy contains a combination of conditions and actions, with a condition being any expression that yields a Boolean value and an action (e.g., invocation of a function, script, code, workflow) being associated with a policy condition in a policy rule. An action is executed when its associated policy condition results in "true" from the policy evaluation step. The process of executing actions, which may be performed as a consequence of the output of the policy evaluation process or during the policy evaluation process, is referred to as policy enforcement. The process of evaluating the policy conditions and executing the associated policy actions up to the point that the end of the policy is reached is referred to as policy evaluation. Policy management refers to the act of describing, creating, updating, deleting, provisioning, and viewing policies. Policy processing refers to policy evaluation or policy evaluation and enforcement A policy rule is a combination of a condition and actions to be performed if the condition is true.

While policies can include any combination of rules, including any combination of conditions and actions, a policy workflow typically refers to the expression of a series of conditions, actions, rules, and/or policies to be executed. For example, workflows or business processes may describe sequences in which rules are executed, or how conditions may be combined with actions to enforce the one or more policies on a communication. The concept of using policies as workflows is described in further detail in U.S. patent application Ser. No. 10/855,999, Ser. No. 10/856,588, and Ser. No. 11/024,160, which are incorporated by reference above. A workflow or business process includes a logical combination of one or more conditions to be satisfied and one or more actions to be executed to enforce or evaluate the one or more policies. In this manner, complex, hybrid, and/or merged topologies are possible.

An exemplary policy can include conditions and actions to check the load of a network route or an end point and redirect a message accordingly where possible and advantageous (i.e., load balancing). Another policy can check the quality of service (QoS) for the traffic or traffic type and route accordingly. Another policy can throttle back traffic when maximum capacity is reached, or when other conditions are met, such as receiving more message traffic than is authorized. Another policy can check account standing and charges, such as within the service layer to a charging enabler, or to a billing system capable of correlating them with the information about the service if available.

Figure 2:
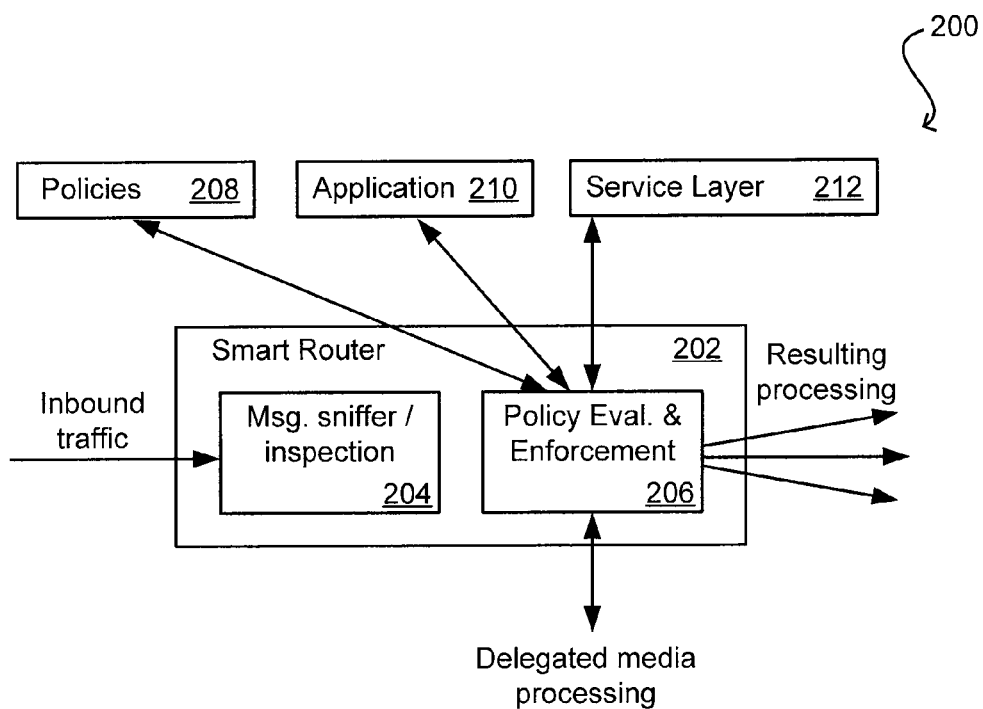
FIG. 2 illustrates a smart router implementation in accordance with one embodiment of the present invention.

Another policy can determine that traffic may have to be filtered, or may require further processing in the service layer. For example, a policy can determine that traffic pertains to messaging such as MMS or email, and can send the traffic to a filtering application (e.g. content filtering, anti-spam, anti-virus, privacy/preference policies of target, etc.) The overall flow for such an embodiment can be described with respect to the configuration 200 of FIG. 2.

In this figure, inbound traffic is received to a sniffer or message inspection module 204 of the smart router 202. The message inspection module also can receive response messages. A policy evaluation and enforcement module 206 of the smart router then can receive the messages from the message inspection module 204, and can apply the appropriate policy or policies to the messages. The application and enforcement of policies can include interaction with the service layer 212 and/or at least one application 210, including session management, as well as media processing or other functionality that is delegated to other processes.

Such a smart router can sniff messages and apply appropriate programmable policies based on appropriate diagnostics. The applicable policies in this embodiment can be set by applications or a service layer, either before or around the time of enforcement, or in response to a query from the smart router. For example, a smart router can delegate tasks such as firewall maintenance, network bandwidth, and network congestion monitoring to a transport layer; tasks such as charging, quality of service verification, session identification, and service level content filtering to a service layer; and tasks such as codec transformation to a message processing module. Such a smart router can route traffic based on the result of such processing as instructed, such as by bouncing, re-directing, or routing the traffic. A smart router also may emulate a target to the sender.

The policy enforcement module in one embodiment includes a rules engine operable to evaluate conditions and execute actions in a selected policy. The selection of a policy from a set of policies stored in a policy store 208 or other accessible location can be part of the evaluation of conditions. The policy enforcement module also can utilize a policy manager that allows for the updating, editing, and managing of the various policies by any authorized principal (e.g., an administrator, user, application, or service layer). The rules engine can work with the service layer and or an application to decide whether a policy should be applied to a communication. If a policy is to be applied, the rules engine can retrieve the appropriate policy from the policy store 208. The communication and policy are then processed with other conditions evaluated and actions executed.

In one embodiment, a smart router is operable to sniff messages, and associate those messages to policies set by a service layer or management based on an appropriate matching algorithm. The router then can process the messages based on the resulting policy instructions, and route the messages based on the resulting policy instructions. The router can hold the message upon instruction, as well as send the traffic to the service layer.

In one example, such a smart router can be driven by the service layer. The router in this example can be the single most important element to ensure that the service policies and/or instructions can be executed by the network, thereby truly allowing the service layer to control the network layer in the presence of a "dumb" network. The smart router can become the only "intelligent" element at the edge of the "controlled" network, ensuring that a service an be informed of any traffic in the network, such as when that information is desired by a policy. The service can be able to instruct the network as to how to handle any related traffic, such as via policies, in order to request and re-direction or processing, for example. Any approach can be used to relate service aspects and traffic. The smart router then also can ensure that any traffic, or information about traffic as specified by the policies, can be exposed and/or passed to the service layer. For example, a message can be passed to the service for filtering prior to directing the message. In Person to Person messaging, this filtering can occur after the interception of the message.

Figure 3:
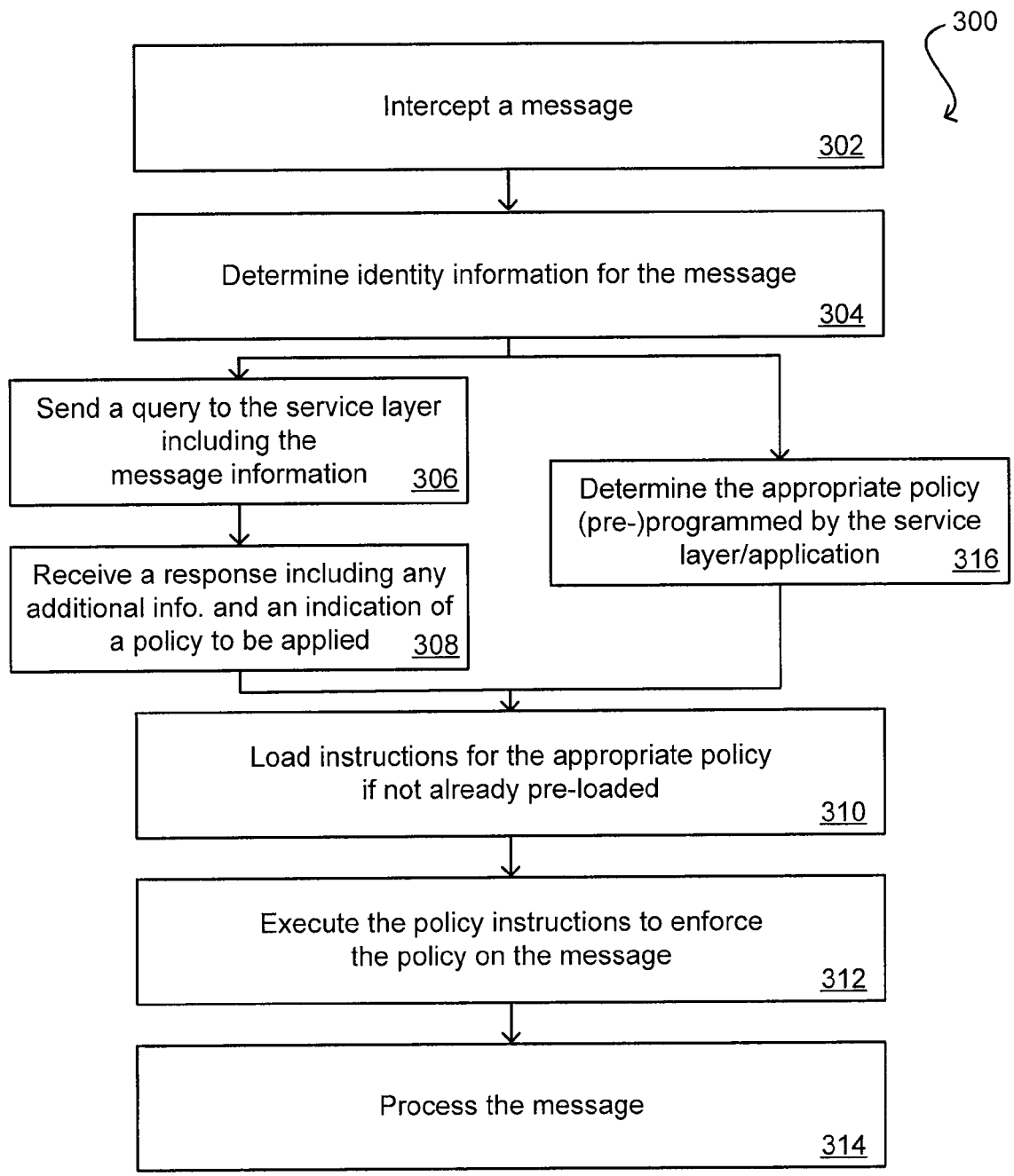
FIG. 3 illustrates steps of a first method that can be used in accordance with one embodiment of the present invention.

For explanation purposes it will be assumed that the smart router can identify traffic as inbound traffic and an associated response, although it should be clear that the notion of inbound traffic is arbitrary. In one example, such as might be the case for an edge server, inbound traffic can be identified as traffic coming from outside the domain, and responses identified as traffic from inside the domain. In other examples such as a local network, however, some of the traffic may be defined as inbound traffic while some is defined as being outbound traffic. Any appropriate criteria can be used for making that definition, based on any appropriate convention. In any case, traffic is intercepted by the router and identified as incoming or outgoing traffic. The traffic can be inspected, such as through a message sniffing procedure, which looks at what is coming in, and infers the type of traffic based on a number of criteria. It is possible that messages may not be encrypted or may only partially encrypted, such that it is possible to actually determine the contents of a message. It is also possible that the smart router is aware of some of the encryption and can delegate decryption and inspection, such as to authorized resources that decrypt the message, check the content, and return the results to the smart router without informing the smart router about the content. Messages also can be encrypted, such that it is not practical to examine the contents of the messages. By examining the type of encryption, the destination, the source, and/or other similar types of information, it is possible to infer the contents of the message. A type of behavior can be assigned to that message based on the inference. In this way any message can be characterized, such as a message going between point A and point B having a certain size and being encrypted a certain way, etc., so that an appropriate policy can be applied The policy evaluation and enforcement module determines which policy or policies to apply to a message based on the inspection and/or inference. The policies can be loaded in advance or just prior to the interaction (e.g., by a service that knows that the traffic will take place), or can be obtained based on a query of the service layer about the session. In one approach 300 described with respect to FIG. 3, a message is intercepted by the smart router 302. The smart router can determine identify information for the message 304, such as the message being part of a media exchange that is taking place between point A and point B. This can be done in a number of ways, such as identifying an origin and destination IP address, addresses of intermediate points in a tunnel in the case of VPN, etc. The two endpoints are identified because those are the points from which the message is received and to where the message is to be delivered.

After the endpoints are identified, a query can be sent to the service layer or another appropriate entity 306. In other embodiments, an event can be passed to the service layer instead of a query. The query can indicate, for example, that the router has received media of a certain type, and can include any information determined about the message. The sending of the query with a characterization of a stream or message that has been intercepted then can result in the returning of a response from the service layer indicating any relevant information from the service layer, such as the identification of an associated session or quality of service for the message or stream, along with an appropriate policy to be applied 308. Alternatively, the service layer could generate a response indicating that there is no information associated with the message or stream, but still indicating an appropriate policy to be enforced based on the information in the query. Such a policy could result in, for example, the blocking of the message, delivery with a lower quality of service, etc. The service layer thus can, in advance or preceding a session, load into the policy evaluation and enforcement module information indicating that if a session is received having certain characteristics, a particular policy should be enforced. Alternatively, the policy evaluation and enforcement module can query an application regarding a particular session to determine whether the application requires a particular policy to be applied. For purposes of efficiency, it can be preferable to load in advance as many policies as possible into the smart router, so that the smart router can act as a preconfigured router where possible, and ask for reactions to events, rather than being configured or using the service layer as a PDP. While both approaches are acceptable, pre-loading can be preferable in more latency-sensitive cases. A set of instructions then is loaded for the appropriate policy 310, which can include any combination of any conditions and any actions as for any policy. Alternatively, it can be determined whether the appropriate policy was programmed or pre-programmed into the smart router, such as by an application or the service layer, before or around the time for policy enforcement 316. If the policy is pre-loaded, then the policy can simply be applied.

The program then can execute at that level and result in a certain amount of operation according to the policy 312. The operation can be to transform or execute a certain type of processing of the media, such as to decrypt the media, transform the media to a different codec, etc. The media that has been transformed as a result of that delegated action now can continue to be transferred to a target 314. Various media also can have associated actions indicating to route the media to a particular target using a particular quality of service. This can be ensured, for example, by sending the media on a priority path of the network having a large amount of available bandwidth, versus sending the media using a more congested network path where there is a lot of traffic and/or less bandwidth. The routing can be dictated, in part, by the fact that one network path is a premium traffic path and one path is not premium.

Figure 4:
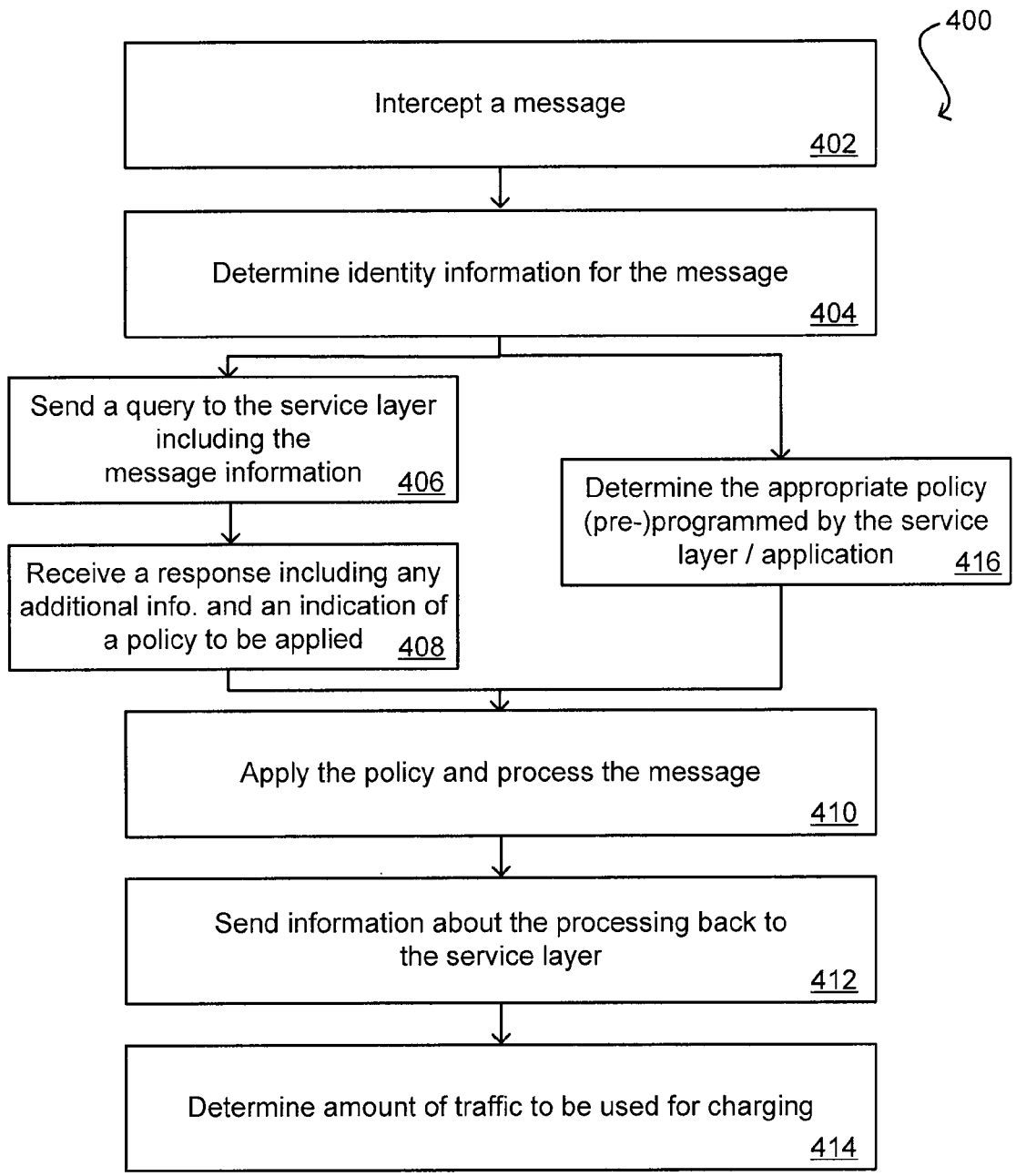
FIG. 4 illustrates steps of a second method that can be used in accordance with one embodiment of the present invention.

Another approach will be described with respect to the method 400 of FIG. 4. In this method, a message is again intercepted by the smart router 402. The smart router determined identify information for the message 404, such as is discussed above. A query is sent to the service layer or another appropriate entity 406, which results in a response indicating an appropriate policy to be applied 408. Alternatively, it can be determined whether the appropriate policy was programmed or pre-programmed into the smart router, such as by an application or the service layer, before or around the time for policy enforcement 416. If the policy is pre-loaded, then the policy can simply be applied. The policy can direct the smart router to not only transform and/or direct the traffic 410, but also to send information back to the service layer 412, such as to determine an amount of traffic and provide the amount of traffic to the service layer so that an appropriate charge can be made for the traffic 414.

In another example, the policy can direct the smart router to examine the traffic and if the traffic is of a certain type, such as RTSP (real-time streaming protocol) traffic, and direct the router to sniff the statistics of the traffic to determine whether the stream is acceptable. The RTSP stream thus would contain in an un-encrypted manner statistics of the quality of video that has been delivered to the client. This information can be sniffed by the smart router and provided to the service layer, for example.

A smart router thus can sniff messages at the interceptor, utilize a policy enforcer to act on that which has been sniffed. The policy enforcer can be programmed ahead of time by loading policies in advance that will act upon whatever has been identified on the characteristics of the traffic. Alternatively, the policy enforcer can (based on the traffic) interrogate the service layer to obtain instructions, load the necessary policies or instructions, and process the traffic accordingly. The type of processing can include, for example, delegating the modifying of the codec, rerouting or distributing the media, or sending back information interacting further with the service layer. Any appropriate function can be performed, as the processor can delegate any type of operations on the media, reroute the media, and interact with the service layer, for example.

While several embodiments are described with respect to the service layer, it should be understood that this is merely exemplary and is not a limitation on the various embodiments. In other examples, the smart router can work with a policy decision point (PDP), which does not involve the service layer. Any layer, module, or application that is capable of making a decision and instructing the smart router can be used. Embodiments utilizing the service layer can be advantageous for various implementations, however, such as where an application or SIP router is driving a session, for example, and thus knows very well that it has a session of media that is associated, and therefore provide an indication of what to do at the media level. In one example, if an application invites a phone or video stream, the application knows media will likely be coming between two given endpoints. Knowing this, the router may determine (directly or indirectly) that this is a premium communication, so instead of utilizing regular bandwidth the traffic should receive high quality bandwidth. A policy then can be utilized that indicates that when media traffic is intercepted between two endpoints, high quality bandwidth should be used to route the traffic. The policy can be loaded dynamically just before processing the message, or in response to processing the traffic, as discussed above.

Figure 5:
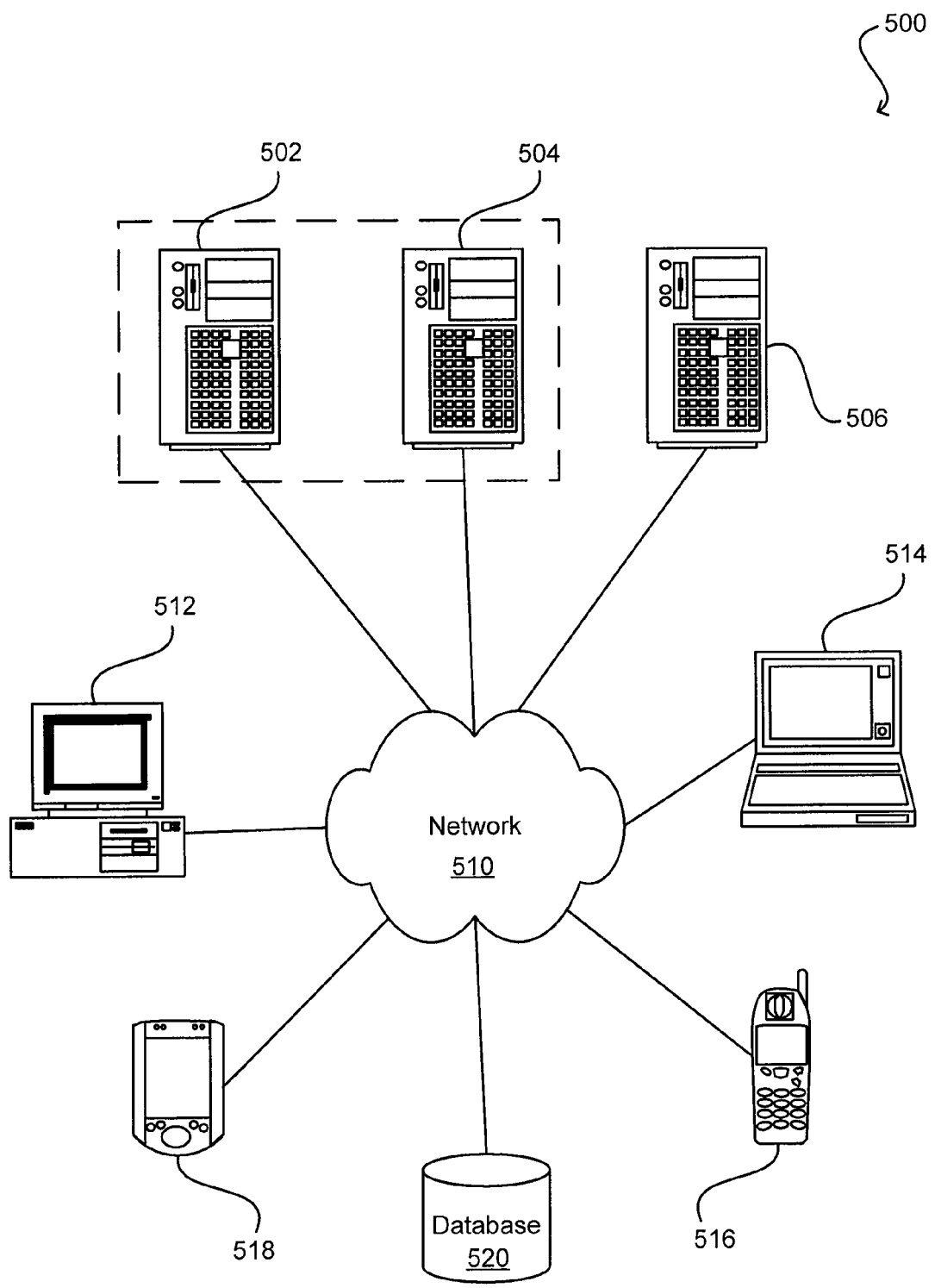
FIG. 5 illustrates components of a computer network that can be used in accordance with one embodiment of the present invention.

FIG. 5 is a block diagram illustrating components of an exemplary operating environment in which various embodiments of the present invention may be implemented. The system 500 can include one or more user computers, computing devices, or processing devices 512, 514, 516, 518, which can be used to operate a client, such as a dedicated application, web browser, etc. The user computers 512, 514, 516, 518 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of applications, including one or more development systems, database client and/or server applications, and Web browser applications. Alternatively, the user computers 512, 514, 516, 518 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the exemplary system 500 is shown with four user computers, any number of user computers may be supported.

In most embodiments, the system 500 includes some type of network 510. The network may can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 502, 504, 506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 506) may be dedicated to running applications, such as a business application, a Web server, application server, etc. Such servers may be used to process requests from user computers 512, 514, 516, 518. The applications can also include any number of applications for controlling access to resources of the servers 502, 504, 506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 512, 514, 516, 518. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 512, 514, 516, 518.

The system 500 may also include one or more databases 520. The database(s) 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via the network 510) with one or more of these. In a particular set of embodiments, the database 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, the database 520 may be a relational database, such as Oracle 10 g, that is adapted to store, update, and retrieve data in response to SQL-formatted commands.

Figure 6:
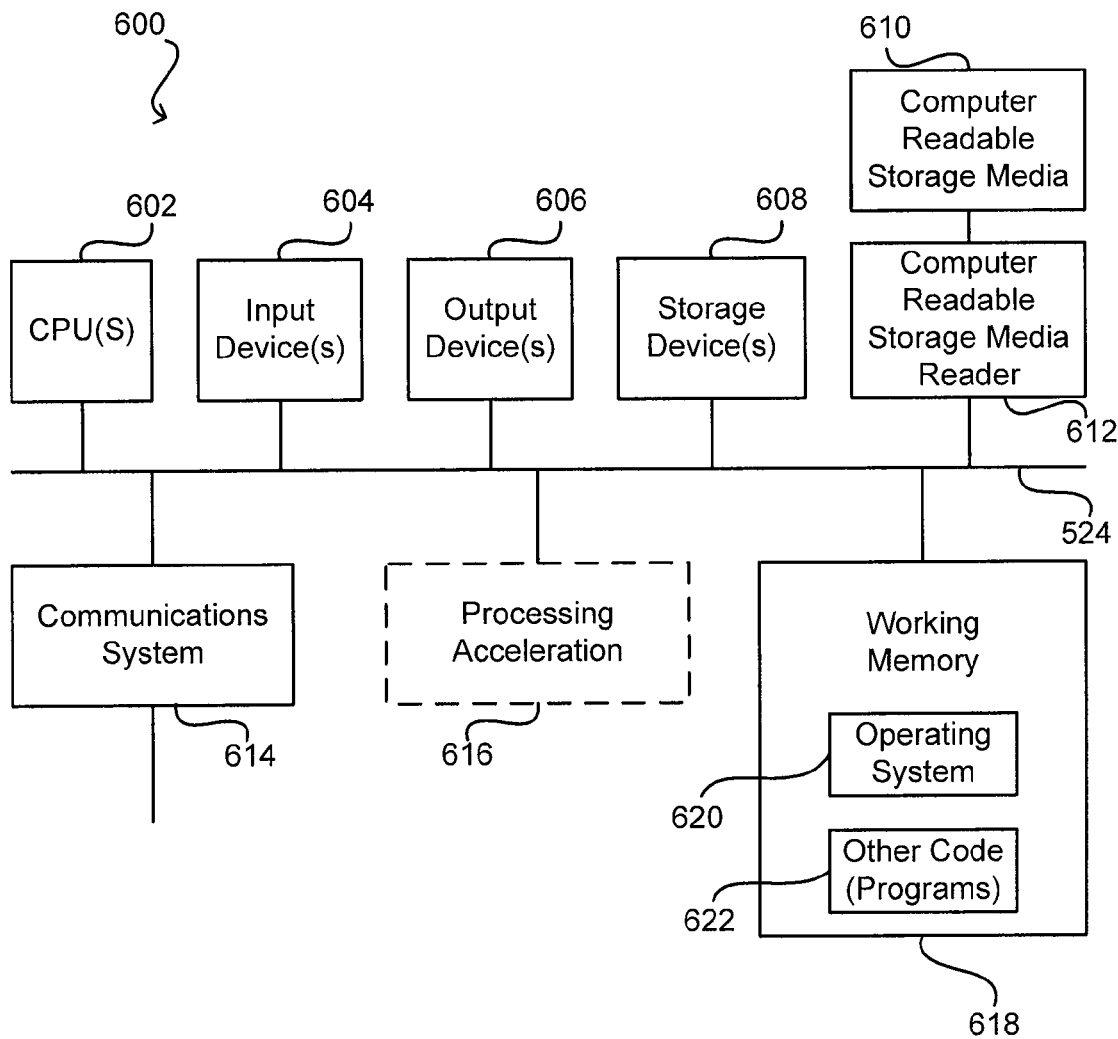
FIG. 6 illustrates components of a computerized device that can be used in accordance with one embodiment of the present invention.

FIG. 6 illustrates an exemplary computer system 600, in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A smart router for processing network traffic at any network level, comprising:
    a message inspection module of the smart router, the smart router handling communications between endpoints of a communications network, the message inspection module operable to receive a message and determine identification information about the message; and
    a policy enforcement module of the smart router operable to dynamically determine from a plurality of policies a policy to enforce on the message based at least in part upon the identification information obtained by the message inspection module, the policy enforcement module being further operable to process the dynamically determined policy,
    wherein the plurality of policies is set by at least one of a service layer and an application of the service layer, wherein determining which policy to enforce is based at least in part on operations being performed at the service layer, wherein the policy enforcement module is further operable to delegate tasks needed to complete enforcing the policy on the message to a module outside of the router, wherein the tasks of needed to complete enforcement of the policy comprise one or more of transport tasks, service tasks, and processing tasks, and wherein the policy enforcement module delegates transport tasks to a transport layer, delegates service tasks to the service layer, and delegates processing tasks to a message processing module.

2. A smart router according to claim 1, wherein the message inspection module is operable to delegate tasks to be performed to complete inspection of the message to at least one of an interceptor and a sniffer operable to perform at least a portion of the inspection and return a result to the message inspection module and wherein the policy enforcement module relies upon the returned results in determining which policy to enforce.

3. The smart router of claim 2, wherein transport tasks comprise one or more of firewall maintenance, network bandwidth monitoring, and network congestion monitoring, wherein service tasks comprise one or more of charging, quality of service verification, session identification, and service level content filtering, and wherein processing tasks comprise codec transformation.

4. A smart router according to claim 1, wherein the policy enforcement module is further operable to direct the message after enforcing the policy.

5. A smart router according to claim 1, wherein the policy enforcement module directs the message by one of bouncing the message, re-directing the message, routing the message, and sending information about the message.

6. A smart router according to claim 1, wherein the message inspection module is further operable to detect encryption of the message and delegate decryption and inspection of the message to a decryption resource authorized to decrypt the message, analyze a content of the message, and return a result of the analysis to the message inspection module without informing the message inspection module about the content.

7. A smart router according to claim 1, wherein the message inspection module includes a packet inspection module operable to inspect packets.

8. A smart router according to claim 1, wherein dynamically determining from a plurality of policies a policy to enforce on the message includes querying at least one of an application and a service layer to determine the appropriate policy.

9. A smart router according to claim 1, wherein dynamically determining from a plurality of policies a policy to enforce on the message includes preloading the policy from at least one of an application and a service layer before or around a time of processing the policy.

10. A smart router for processing network traffic at any network level, comprising:
    a message inspection module of the smart router, the smart router handling communications between endpoints of a communications network, the message inspection module operable to receive a message and determine identification information about the message, wherein the message inspection module delegates tasks to be performed to complete inspection of the message to at least one of an interceptor and a sniffer operable to perform at least a portion of the inspection and return a result to the message inspection module; and
    a policy enforcement module of the smart router operable to dynamically determine from a plurality of policies a policy to enforce on the message based at least in part upon the identification information obtained by the message inspection module, the policy enforcement module being further operable to process the dynamically determined policy, wherein a decision as to which policy of the plurality of policies to enforce based on the identification information is determined based at least in part on operations being performed at the service layer, wherein the policy enforcement module delegates tasks needed to complete enforcing the policy on the message to a module outside of the router, wherein the tasks needed to complete enforcement of the policy comprise one or more of transport tasks, service tasks, and processing tasks, and wherein the policy enforcement module delegates transport tasks to a transport layer, delegates service tasks to the service layer, and delegates processing tasks to a message processing module.

11. The smart router of claim 10, wherein transport tasks comprise one or more of firewall maintenance, network bandwidth monitoring, and network congestion monitoring, wherein service tasks comprise one or more of charging, quality of service verification, session identification, and service level content filtering, and wherein processing tasks comprise codec transformation.

12. A method of processing network traffic, comprising:
receiving a message at a router handling communications between endpoints of a communications network;
preloading with the router a plurality of policies, each of the plurality of policies operable to be applied to the message;
determining identifying information about the message with the router based at least in part on delegating tasks to perform inspection of the message to a module outside of the router;
determining with the router based on the identifying information and operations being performed at a service level an appropriate policy of the plurality of policies to apply to the message; and
processing the appropriate policy with the router for the message, wherein processing the appropriate policy includes delegating tasks to be performed to complete enforcement of the policy to modules outside of the router, wherein the tasks needed to complete enforcement of the policy comprise one or more of transport tasks, service tasks, and processing tasks, and wherein the router delegates transport tasks to a transport layer, delegates service tasks to the service layer, and delegates processing tasks to a message processing module.

13. The method of claim 12, wherein transport tasks comprise one or more of firewall maintenance, network bandwidth monitoring, and network congestion monitoring, wherein service tasks comprise one or more of charging, quality of service verification, session identification, and service level content filtering, and wherein processing tasks comprise codec transformation.

14. A computer readable medium having stored therein a series of instructions which, when executed by a processor, cause the processor to process network traffic by:
receiving a message at a router;
preloading with the router a plurality of policies, each of the plurality of policies operable to be applied to the message;
determining identifying information about the message with the router based at least in part on delegating tasks to perform inspection of the message to a module outside of the router;
determining with the router based on the identifying information and operations being performed at a service level an appropriate policy of the plurality of policies to apply to the message; and
processing the appropriate policy with the router for the message, wherein processing the appropriate policy includes delegating tasks to be performed to complete enforcement of the policy to modules outside of the router, wherein the tasks needed to complete enforcement of the policy comprise one or more of transport tasks, service tasks, and processing tasks, and wherein the router delegates transport tasks to a transport layer, delegates service tasks to the service layer, and delegates processing tasks to a message processing module.

15. The computer readable medium of claim 14, wherein transport tasks comprise one or more of firewall maintenance, network bandwidth monitoring, and network congestion monitoring, wherein service tasks comprise one or more of charging, quality of service verification, session identification, and service level content filtering, and wherein processing tasks comprise codec transformation.

* * * * *

UNITED STATES PATENT AND TRADEMARK OFFICE
CERTIFICATE OF CORRECTION

| | | |
|---|---|---|
| PATENT NO. | : 8,117,335 B2 | Page 1 of 1 |
| APPLICATION NO. | : 11/669094 | |
| DATED | : February 14, 2012 | |
| INVENTOR(S) | : Maes | |

It is certified that error appears in the above-identified patent and that said Letters Patent is hereby corrected as shown below:

In column 4, line 45-46, delete "enforcement" and insert -- enforcement. --, therefor.

In column 5, line 52, delete "and or" and insert -- and/or --, therefor.

In column 6, line 6, delete "an be" and insert -- can be --, therefor.

In column 10, line 1, delete "(e.g," and insert -- (e.g., --, therefor.

Signed and Sealed this
First Day of May, 2012

David J. Kappos
*Director of the United States Patent and Trademark Office*